United States Patent
Da Silva et al.

(10) Patent No.: US 9,980,186 B2
(45) Date of Patent: May 22, 2018

(54) METHODS AND APPARATUS FOR PERFORMING HO DECISIONS IN A MOBILE NETWORK

(71) Applicant: Telefonaktiebolaget LM Ericsson (publ), Stockholm (SE)

(72) Inventors: Icaro L. J. Da Silva, Solna (SE); Peter Vaderna, Budapest (HU); Yu Wang, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days. days.

(21) Appl. No.: 15/527,381

(22) PCT Filed: Nov. 19, 2014

(86) PCT No.: PCT/SE2014/051380
§ 371 (c)(1),
(2) Date: May 17, 2017

(87) PCT Pub. No.: WO2016/080876
PCT Pub. Date: May 26, 2016

(65) Prior Publication Data
US 2017/0325140 A1 Nov. 9, 2017

(51) Int. Cl.
*H04W 36/00* (2009.01)
*H04W 36/30* (2009.01)

(52) U.S. Cl.
CPC ....... *H04W 36/0088* (2013.01); *H04W 36/30* (2013.01)

(58) Field of Classification Search
CPC .......................... H04W 36/0088; H04W 36/30

USPC .................................. 455/436–438; 370/338
See application file for complete search history.

(56) References Cited

U.S. PATENT DOCUMENTS

| 2011/0086635 | A1 | 4/2011 | Grob-Lipski |
| 2013/0150053 | A1* | 6/2013 | Hwang ............ H04W 36/0083 455/440 |
| 2013/0223403 | A1 | 8/2013 | Chen et al. |

OTHER PUBLICATIONS

International Search Report and Written Opinion dated Aug. 10, 2015 in International Application No. PCT/SE2014/051380, 13 pages.

(Continued)

*Primary Examiner* — Marcos Batista
(74) *Attorney, Agent, or Firm* — Rothwell, Figg, Ernst & Manbeck, p.c.

(57) ABSTRACT

A method for performing handover decisions for established radio connections in a mobile network is provided where the method comprise: requesting (6:10) a drop prediction report from a communication device, indicating whether or not an established radio connection is predicted to drop; receiving (6:20) a requested drop prediction report associated with the radio connection; determining (6:40), based on the content of the report, whether a first condition has been fulfilled; configuring a first threshold value specifying when a measurement report is to be provided from the communication device using the radio connection for which the drop prediction report has been received, in case the first condition has been fulfilled, and transmitting (6:60) the configured threshold value or an indication of the configured threshold value to the communication device.

14 Claims, 8 Drawing Sheets

(56) References Cited

OTHER PUBLICATIONS

"LTE; Evolved Universal Terrestrial Radio Access (E-UTRA) and Evolved Universal Terrestrial Radio Access Network (E-UTRAN); Overall Description; Stage 2 (3GPP TS 36.300 version 12.3.0 Release 12)" (Sep. 2014), 230 pages.

* cited by examiner

METHODS AND APPARATUS FOR PERFORMING HO DECISIONS IN A MOBILE NETWORK

CROSS-REFERENCE TO RELATED APPLICATION(S)

This application is a 35 U.S.C. § 371 National Stage of International Patent Application No. PCT/SE2014/051380, filed Nov. 19, 2014, designating the United States, the disclosure of which is incorporated by reference.

TECHNICAL FIELD

The present disclosure relates to methods and an apparatus for performing handover (HO) decisions in a mobile network.

BACKGROUND

A mobile network, or a radio communication network, such as e.g. a Wideband Code Division Multiple Access (WCDMA) network, a Long Term Evolution (LTE) network, or any other type of mobile network capable of providing wireless network access commonly rely on a large number of geographically distributed base stations or access nodes which are capable of providing network access to communication devices or User Equipments (UE). In order to accomplish this it is a very fundamental requirement of the mobile network that as a communication device move between different cells of the network, it must be capable to hand over an ongoing radio connection, i.e. a voice call or a data session from one base station to another with none or minor disruptions.

A HO can occur between cells arranged within one and the same Radio Access Technology (RAT), e.g. as a HO from one LTE cell to another LTE cell, or as an inter-RAT HO, also referred to as IRAT HO, such as e.g. a HO from an LTE cell to a WCDMA cell, or from an LTE cell to a Universal Mobile Telecommunication System (UMTS), or vice versa. If adapted therefore, a HO may also be executed between a $3^{rd}$ Generation Partnership Project (3GPP) access technology network, such as e.g. any of the ones mentioned above, and a non-3GPP access network technology, such as e.g. a Wireless Local Area Network (WLAN).

A HO between LTE cells may be referred to as an Intra-LTE HO, which assures that a communication device is being served by the most suitable cell at all times, thereby avoiding the occurrence of call drops, or interruptions, as a communication device is moving out of coverage of one LTE cell into the coverage of another cell. A HO performed in an LTE enabled mobile network is network controlled based upon measurement reports, which may also be referred to as UE measurement reports, provided from a serving cell as well as from neighboring cells.

An intra-LTE HO process is managed by a radio base station, referred to as eNodeB or eNB in an LTE network. FIG. 1 is illustrating a procedure for preparing for and executing an intra-LTE HO, according to a prior art solution, as described in 3GPP TS 36.300. The procedure as described in FIG. 1 can be divided into an initial measurement phase, followed by a preparation phase and a final execution phase.

The initial measurement phase handles measurements as illustrated with steps 1:1-1:10. As indicated in step 1:1 necessary signalling is exchanged between a serving Gateway (GW) 100, A Mobility Management Entity (MME) 110, a source eNB 120, i.e. the eNB presently serving a UE 140, and a target eNB 130, i.e. the eNB to which the radio connection will eventually be handed over. In a next step 1:2 a request for measurements (measurement control) is sent from the source eNB 120 to the UE 140 which need to perform a HO. The measurement control sets different parameters determining certain conditions for the preparation of a HO, to the UE 140, one of which is referred to as a hysteresis, or HO hysteresis, while another is referred to as Time-To-Trigger (TTT). In the meantime packet data is distributed over the network, as indicated with steps 1:3a and 1:3b. The UE 140 responds by making periodic measurements, as indicated with step 1:5, after having performed UL allocation, as indicated with step 1:4. The periodic measurements are indicating the quality of the radio signal, received from the serving cell and adjacent cells, for maintaining the ongoing radio connection and the radio bearers providing the radio connection. Such measurements are commonly referred to as a Reference Signal Received Power (RSRP) and Reference Signal Received Quality (RSRQ). In case the applied HO algorithm is based on RSRP measurements, an RSRP value from an adjacent cell exceeding the corresponding value from the serving cell by a number of dBs equal to the HO hysteresis will trigger the starting of a timer and the UE will enter a phase which is referred to as Event3A.

Once the timer has started, the process can continue according to one of two scenarios. According to one scenario, the RSRP value of the serving cell can improve during the TTT, so that this value becomes better than the best adjacent cell by a number of dBs equal to the HO hysteresis. In this case the UE 140 will stop the timer with a "Leave Event3A" event, leading to that no HO will be executed. UE 140 will instead be served by the serving cell and nothing more will be reported to the network. According to another scenario the TTT will time out without the serving cell becomes sufficiently better than the best adjacent cell by a number of dBs equal to the HO hysteresis. The UE 140 will then send a measurement report, as indicated with step 1:5 to the source eNB 120, which will evaluate the content of the report and make a HO decision based on the evaluation, as indicated with a subsequent step 1:6. TTT and HO hysteresis are configurable parameters which can be optimized by the network. The preparation phase is now started by the source eNB 120, transmitting a HO request, following the HO decision, to the target eNB 130, in another step 1:7, after which the target eNB 130 responds by executing an admission control 1:8 and acknowledging the request, as indicated with another step 1:9, and making a Downlink (DL) allocation for UE 140, after which the HO execution phase is initiated, as indicated in step 1:11, and the HO is completed in a subsequent step 1:12. The execution phase occurs mainly between the UE 140 and the target eNB 130, involving e.g. synchronization and random access. During this phase there will be an outage time where neither the source nor the target cell can reach the UE 140. Packets arriving at the source eNB 120 during the outage period will either be dropped or forwarded to the target eNB 130, where the target eNB will send the packets to UE 140 when it is reconnected. At the end of the HO execution phase the DL path is switched from the source eNB 120 to the target eNB 130, and the UE 140 context is released in the source eNB 120.

The already mentioned IRAT HO may occur when a UE moves from the coverage of one RAT into the coverage of an alternative RAT. The IRAT HO mechanisms can also be used for the purpose of balancing the load between two RATS and systems. The IRAT typically comprise phases which correspond to the phases mentioned above with reference to the RAT HO.

The measurement report is configured to UEs by the mobile network, e.g. the ENB of an LTE network. Such reports may be event triggered or triggered on a periodical basis. For an event triggered report, the trigger criteria are configured by the network. By way of example, a source or serving eNB configures UMTS measurements in a UE by providing a so called "RRC Connection Reconfiguration" message to the UE, where the required thresholds for measurement activation are included in the message. The mentioned message also contains the UMTS frequency to be measured by the UE. Once the activation criteria have been fulfilled, the UE measures the UMTS frequency and responds a RRC measurement report, which corresponds to the measurement report, to the eNB. The eNB then takes a decision to perform an IRAT HO to UMTS based on the received report. It is also possible for the network to order an RRC measurement report from a UE by transmitting such a command to the UE. Once an IRAT HO decision has been made, the eNB will continue to perform HO preparation and HO completion.

A release of radio bearers providing a radio connection between a UE and an eNB can have multiple reasons. One release can be due to user inactivity, after expiry of an inactivation timer; a release can be initiated by a mobile user of a UE, or a release can be the result of a successful RAT HO or IRAT HO. However, there can also be abnormal releases, which may also be referred to as drops or session drops, due to e.g. low radio quality, either in the DL or UL direction; transport link problems in the eNB or failed HO.

Unexpected session drops may seriously impact the Quality of Experience (QoE) of mobile users, mainly for bearers carrying a real-time service, such as e.g. Voice-over-IP (VoIP). One of the most important features expected for bearers experiencing a drop is retainability, which is defined as the ability of a UE to retain the bearer once connected, for a desired duration. Retainability Key Performance Indicators (KPI) may be measured in different ways, such as e.g. by measuring the number of dropped sessions normalized with the total number of sessions (drop ratio). In order to improve retainability, there are several ways to optimize the radio network. One way is to ensure sufficient coverage in the server geographical area and also to apply Self-Organizing Network (SON) functions to automatically optimize for coverage and interference. Another way to optimize the network is to fine-tune the handover procedure in order to avoid situations where a HO is initiated too late, i.e. to avoid that a session is dropped before HO execution, that the HO is too early and the session is dropped because the HO fails, or the signal of the target cell is too weak. Such an optimization can be achieved by proper HO parameter settings.

One of the most important purposes with mobile network HO is to avoid drops. A conventional HO can be triggered by low received signal strength from a serving cell which is specified by pre-configured fix thresholds, such as e.g. thresholds referred to as event A2/A3/B2 thresholds applied in LTE networks. Even though there is a high positive correlation between poor radio signal quality and a drop, there is a large uncertainty to predict drop based only on a comparison between the signal quality and fixed thresholds. The exact radio quality level that will eventually cause a drop normally varies in different geo-locations, under different user mobility conditions and with different UEs or terminal types. It is a very difficult, if not impossible, task to optimize the applied thresholds for all occurring variances. Moreover, apart from insufficient received signal strength, drops may be caused by other factors, such as e.g. radio interference, uplink signal to noise ratio, or even measurement problems at the UE. Thus, it might be that one or more of these factors cause a session drop even if parameters to trigger a HO still do not reach a certain threshold value.

According to another example, referring to an IRAT HO from a newly deployed RAT, such as e.g. a HO from LTE to a legacy RAT e.g. GSM, many operators have a policy to keep the UEs in the more advanced RAT unless a drop is going to happen, in order to fully exploit the advantage of the new RAT. In such a case, it may be difficult to set the radio quality threshold to an appropriate level, just high enough to avoid a drop. A conservative threshold is usually configured, with the consequence that many UEs are handed over to the legacy RAT too early.

SUMMARY

It is an object of the present document to address, or at least alleviate, at least some of the problems described above.

According to one aspect a method for preparing for handover decisions for established radio connections is suggested, where a drop prediction report is first requested from a communication device, where the report is indicating whether or not an established radio connection is predicted to drop. A drop prediction report associated with the radio connection is then received from the communication device, and, a threshold value, specifying when a measurement report is to be provided from the communication device using the radio connection for which the drop prediction report has been received, is then determined, based on the content of the report. It is then determined whether or not the determined threshold value is equal to a currently applied threshold value, and the determined threshold value, or an indication of the determined threshold value, is transmitted to the communication device, in case the determined value is not equal to the currently applied threshold value.

By applying the suggested method, a dynamic threshold value will be applied, which can be dynamically adapted, depending on the change of drop prediction.

According to one embodiment, the request for a drop prediction report comprises at least one condition, indicating for the communication device when to provide the requested drop prediction report, i.e. in addition to adjusting the threshold value as such, also the conditions for when to provide a drop prediction report, and, thus, the conditions for amending the threshold value can be adjusted.

One applicable condition may e.g. be specified as the occurrence of a certain predefined event at the communication device, such as e.g. a drop prediction of a radio connection which is exceeding a predefined drop change threshold.

According to another embodiment, at least one condition is specified as a periodicity, such that a drop prediction report will be received repeatedly at a certain time interval, irrespective of other conditions.

The indication of a drop prediction report may be any of a binary indication, indicating a predicted drop or no predicted drop of a radio connection, or a probability indication, indicating a probability of drop of the radio connection, depending on the wanted granularity of the possible threshold value adaptation.

According to another aspect an apparatus, capable of preparing for handover decisions for established radio connections, is suggested. Such an apparatus is configured to: request a drop prediction report from a communication device, indicating whether or not an established radio connection is predicted to drop; receive a requested drop prediction report associated with the radio connection, from the communication device; determine, based on the content of the report, a threshold value specifying when a measurement report is to be provided from the communication device using the radio connection for which the drop prediction report has been received; determine whether or not the determined threshold value is equal to a currently applied threshold value, and to transmit the determined threshold value, or an indication of the determined threshold value, to the communication device, in case the determined value is not equal to the currently applied threshold value.

According to one embodiment, the apparatus is configured to include into the request at least one condition indicating for the communication device when to provide the requested drop prediction report. In the latter case the apparatus may be configured to specify the at least one condition as the occurrence of a predefined event. According to another embodiment the apparatus is configured to request for a drop prediction report periodically.

The may either be configured to interpret the indication of a drop prediction report as any of a binary indication, indicating a predicted drop or no predicted drop of a radio connection, or as a probability indication, indicating a probability of drop of the radio connection.

According to yet another aspect, an apparatus capable of preparing for handover decisions for established radio connections, is suggested, where the apparatus comprise a processor and a memory, capable of storing instructions which when executed by the process causes the apparatus to: request a drop prediction report from a communication device, indicating whether or not the established radio connection is predicted to drop; receive, from the communication device, a requested drop prediction report associated with the radio connection; determine, based on the content of the report; a threshold value specifying when a measurement report is to be provided from the communication device using the radio connection for which the drop prediction report has been received; determine whether or not the determined threshold value is equal to a currently applied threshold value, and transmit the determined threshold value, or an indication of the determined threshold value, to the communication device, in case the determined value is not equal to the currently applied threshold value.

According to yet another aspect, a computer program, executable on an apparatus, capable of preparing for handover decisions for established radio connections is suggested. The computer program comprise instructions which, when run on the apparatus causes the apparatus to: request a drop prediction report from a communication device, indicating whether or not the radio connection is predicted to drop; receive a requested drop prediction report associated with the radio connection from the communication device; determine, based on the content of the report; a threshold value specifying when a measurement report is to be provided from the communication device using the radio connection for which the drop prediction report has been received; determine whether or not the determined threshold value is equal to a currently applied threshold value, and transmit the determined threshold value, or an indication of the determined threshold value, to the communication device, in case the determined value is not equal to the currently applied threshold value.

According to yet another aspect, a computer program product is also suggested, which comprises a computer program, such as the one suggested above, and a computer readable means on which the computer program is stored.

BRIEF DESCRIPTION OF DRAWINGS

Embodiments will now be described in more detail in relation to the accompanying drawings, in which.

DETAILED DESCRIPTION

Briefly described, methods and an apparatus capable of executing the suggested methods, are provided where drop predictions are executed in a mobile network for supporting mobility procedures, or more specifically preparations for HO decisions.

Figure 1:
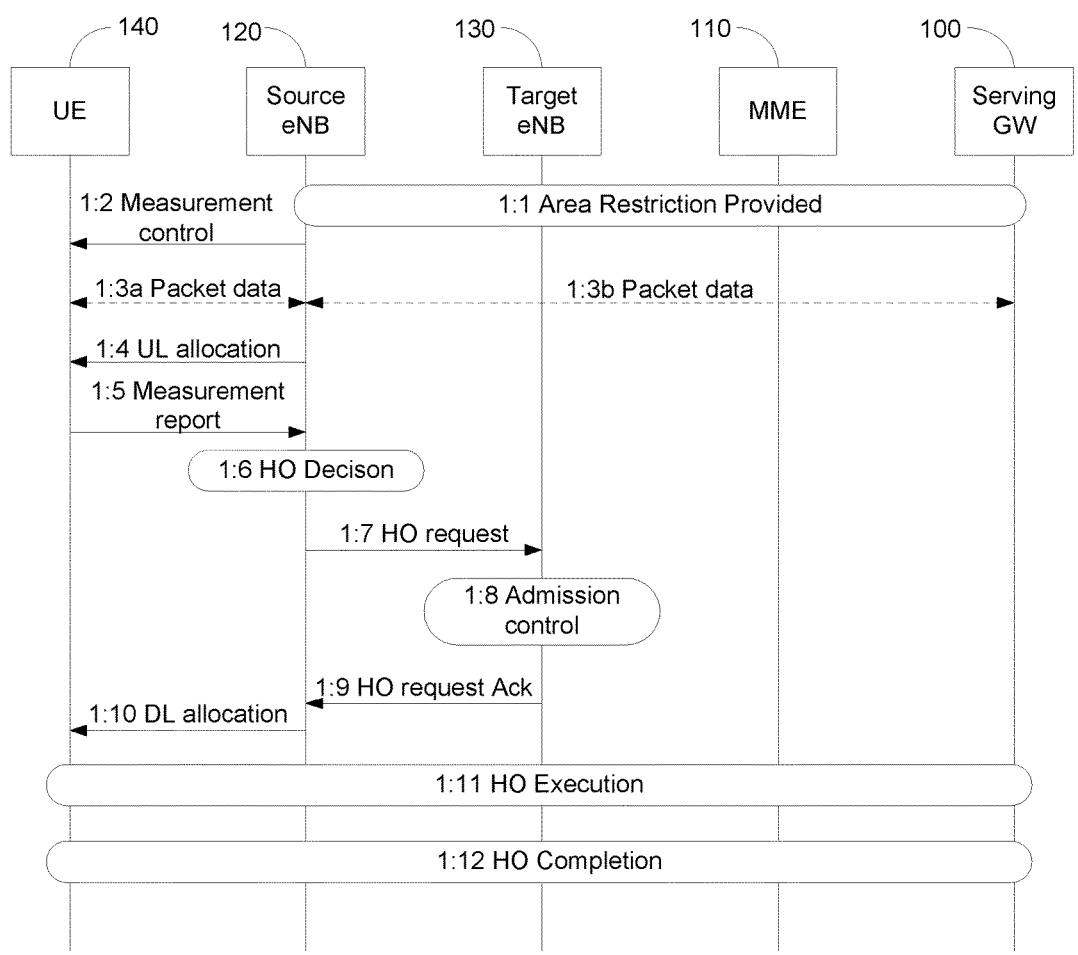
FIG. 1 is a simplified signalling scheme, illustrating steps which are executed in a communication network when preparing for and executing a HO according to the prior art.
Figure 2:
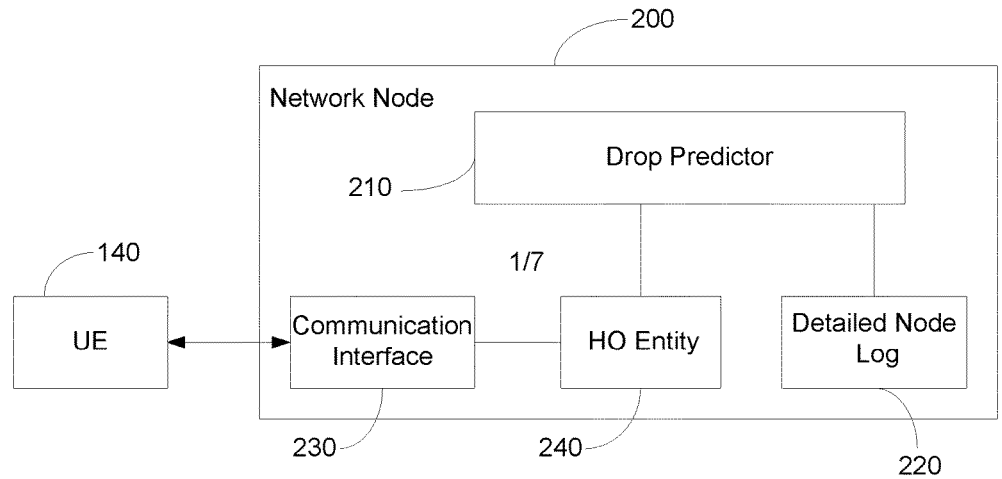
FIG. 2 is a simplified block scheme illustrating a network node comprising an integrated drop predictor as described herein for assisting in HO decisions or preparations for such decisions.

More specifically, new, refined HO procedures are suggested where parts of the suggested procedures will rely and depend on knowledge of drop prediction. The suggested procedures rely on an estimated drop prediction provided from a functional entity referred to as a Drop Predictor, which is configured to assist in preparations of HO decisions. FIG. 2 is illustrating a block scheme of functionality of a network node 200 which is capable of assisting in HO decisions as is suggested in this disclosure. The network node 200 comprises a Drop Predictor 210, which base its predictions on a Machine Learning (ML) application or algorithm, which is capable of providing a prediction of session drops from given conditions of user sessions. Performing drop prediction based on an ML algorithm as such is already known, e.g. from the publication "Using Big Data for Improving Dependability: A Cellular Network Tale", Nawanol Theera-Ampornpunt et al., HotDep '13 Proceedings of the 9$^{th}$ Workshop on Hot Topics in Dependable Systems Article No. 2, Nov. 3-6, 2013. The way a drop prediction is derived from a drop predictor is therefore out of the scope of this document. The applied ML algorithm, may be chosen from any known ML algorithm, such as e.g. classification trees, neural networks, support vector machines, random forests or boosted trees. A combination of AdaBoost and Support Vector Machine (SVM), as suggested in the cited document, is another suitable classification algorithm that is trained continuously from the stored event logs, here represented by a functional unit or module referred to as a Detailed Node Log 220. The Network node 200 also comprises a communication interface 230, enabling communication between the network node 200 and UEs, here represented by UE 140, and a HO entity 240, which is capable of executing conventional HO related steps and procedures, such as the ones described above, with reference to FIG. 1, with the assistance of drop prediction data provided from the drop predictor 210. Once a ML algorithm has been trained and has been found to be valid, it can be used for predicting the likeliness of a drop of ongoing sessions by measuring radio conditions in real time.

As already been mentioned above, one of the most important purposes of HO is to avoid session drops. The amended HO mechanism suggested above applies drop prediction based on a continuously trained ML algorithm when making its HO decisions. Compared to prior art solutions, the number of drops may therefore be reduced, since the number of HO which are executed too late, as well as the number of un-necessary HO will be reduced. Consequently, the use of drop prediction as will be described in further detail below will result in improved user experience and system efficiency.

Even though the functionality of FIG. 2 is arranged within one single entity, namely network node 200, it is to be understood, that one or more of the functional units or modules as described in FIG. 2 may alternatively be arranged in one or more other physical entities, as long as each entity can access and process data as described above. One or more of the functionality relating to the drop predictor, the HO entity, the Detailed Node Log, or parts thereof may e.g. be provided as cloud services. The same goes for the remaining device architectures suggested below with reference to FIG. 3-5.

Figure 3:
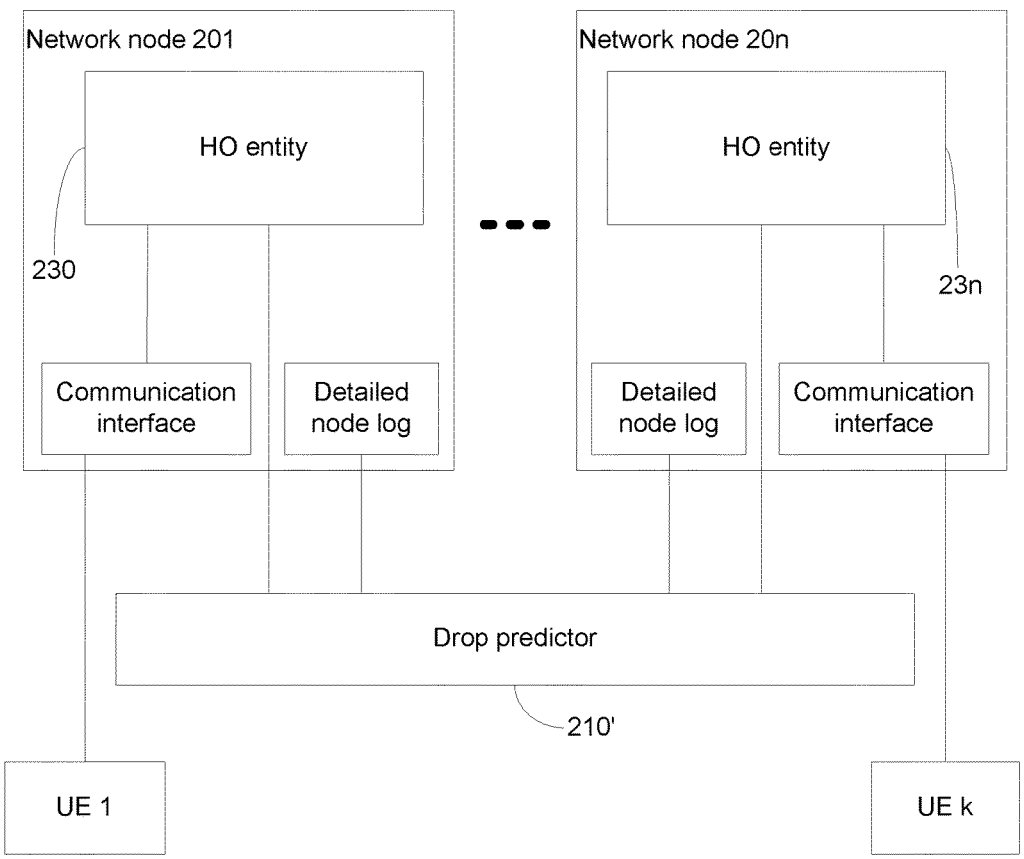
FIG. 3 is a simplified architecture illustrating block schemes of two network nodes sharing a drop predictor.

FIG. 3, is illustrating a plurality of network nodes here represented by network nodes 201-20n, where each network node comprise a respective HO entity, a communication interface and a detailed node log, as suggested in FIG. 2. However, compared to FIG. 2 the network nodes are sharing a common Drop Predictor 210'. The common drop predictor 210' may e.g. be implemented in a separate node of a core network, e.g. in a Mobility Management Entity (MME) or within the management domain, e.g. as part of the Operations Support System (OSS).

Figure 4:
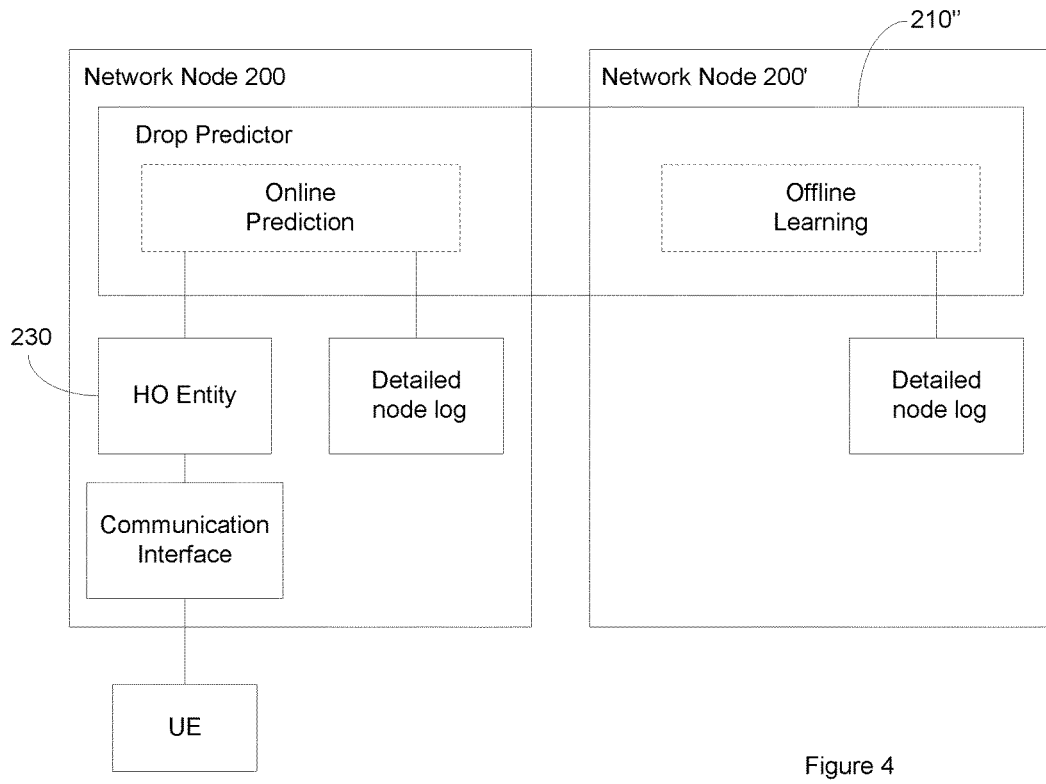
FIG. 4 is a simplified architecture illustrating how functionality of a drop predictor can be distributed over two different network nodes, where one of the network nodes is capable of performing online prediction, while the other network node is capable of performing offline learning.

FIG. 4 is illustrating another alternative configuration, where the functionality of network node 200 of FIG. 2 or of the network nodes of FIG. 3 is distributed, such that actual online prediction which the drop predictor 210" of FIG. 4 is providing to the HO entity 230 is provided from one of the network nodes 200, while offline learning of an applied ML algorithm, as suggested above, is provided from another network node 200' or physical platform. It is to be understood that although, the previously described embodiments do not explicitly illustrate dedicated online prediction and offline learning functionality, such functionality is provided also in these embodiments.

Figure 5:
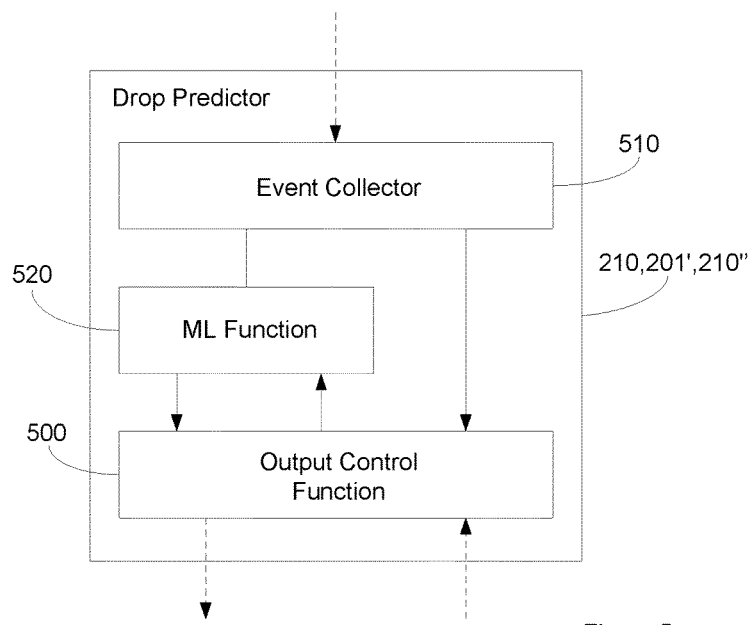
FIG. 5 is a block scheme illustrating the drop predictor illustrated in any of FIG. 2-4 in further detail.

Even though the functionality of the drop predictor as such is out of the scope of this document, the basic functionalities of a drop predictor suitable for assisting one or more HO entities as suggested herein will now be described in further detail for a better understanding of this functionality. FIG. 5 is a block scheme of a drop predictor, comprising an interface towards the HO entity, as illustrated in FIG. 2-4, thereby enabling the HO entity to request drop predictions from the drop predictor 210,210', 210" for selected radio connections, either on a periodical basis, or on-demand. The drop predictor 210,210',210" comprises a function, here referred to as an Output Control Function 500, which controls the interface towards the HO entity. In one operation mode, the HO entity may be configured to request for an instant drop prediction result for a list of users by providing the relevant user IDs to the drop predictor 210, 210'210" via the output control function 500. In another operation mode, the HO entity may instead be configured to request for periodic prediction reports from the drop predictor 210,210'210". In the latter scenario the output control function 500 will be configured to start and regularly re-start a time and request for prediction reports from a ML function 520, capable of executing drop predictions using ML, each time the timer expires.

The output control function 500 then retrieves the actual session information needed for performing a drop prediction from another functional unit, here referred to as an Event Collector 510, which is capable of collecting data associated with relevant radio connections from one or more detailed node logs, as mentioned above. More specifically, the event collector 510 collects relevant data in real-time and from the collected data it constructs, stores and updates session records. In an LTE network a session is a radio bearer session within a radio cell that is started by a successful Radio Resource Control (RRC) setup, or a successful HO into a radio cell. The session is terminated with UE context release or a successful HO out of the cell. Within each session, certain conditions are reported periodically. These conditions can be e.g. measured radio conditions, such as e.g. Channel Quality Index (CQI), Signal to Interference plus Noise Ratio (SINR) on the Physical Uplink Shared Channel (PUSCH), SINR on the Physical Uplink Control Channel (PUCCH), terminal conditions, such as e.g. UE or communication device type, radio protocol conditions, such as e.g. RLC retransmission rate. At the end of the session it may also be reported if a release was normal or abnormal.

In the present context a communication device may refer to a device used and handled by a user, such as e.g. a cellular telephone, a laptop, a pad, or a device which may not require any human interactions, such as e.g. a M2M device.

The session records prepared by the event collector 510, are used by the central part of the drop predictor 210,210', 210", namely the function capable of executing machine learning on the acquired session records, here referred to as a ML Function 520. In order to be able to adapt prediction results to the various conditions of the operational network, the ML function 520 uses an automatic ML algorithm to learn the conditions leading to drops. As commonly done by ML algorithms, a model is trained with sessions having known conditions and known outcome, i.e. a dropped or not dropped radio connection. Since there is no need to interpret the ML results regarding the input parameters and their relations to the predicted outcome, any type of "black box" method is suitable for real-time prediction. As mentioned above, numerous different types of ML algorithms are known. All mentioned methods use the same input data and provide basically the same output, with the difference that different learning methods and evaluation methods are applied. When using ML algorithms, as suggested above, it is also essential to perform validity checks. Even if a drop is predicted based on certain inputs, it should not affect the network operation if the prediction has a high probability of error. Different types of validity checks are known, such as e.g. cross-validation, which is suitable for the described context, where a training data set and a test data set are kept separated in complementary subsets, forming a training data set and a test data set.

Since conditions typically continuously change over time, e.g. due to new terminal types appearing, software upgrades of network nodes, change of traffic characteristics, the ML algorithm should be trained and validated continuously, or at least refreshed from time to time. If a drop predictor is logically arranged in or for one single network node, such a drop predictor will be trained and adapted to the local conditions of that network node. In such a scenario the number of samples may be relatively low, which may result in that it will take more time to train the applied ML model. If, on the other hand, the drop predictor is shared between a plurality of network nodes, e.g. arranged in a central node, such as e.g. an Operation and Maintenance (O & M) system of the mobile network, the number of samples will be higher and the reliability of the applied ML model will most likely also be better.

The output of the ML function 520 is provided to the output control function 500 which forwards this output to the requesting HO entity, so that the HO entity can make use of the result and thereby enhance its HO decisions.

The output of the ML function may be a binary classification result, i.e. a particular session under consideration is either predicted to be dropped or not. Alternatively, the output may be provided as a probability, i.e. a value between 0 and 1, which indicates the probability of a dropped session.

When a drop of a session is predicted an immediate action is preferred in order make an effort to avoid the predicted drop, here by seeking the opportunity to handover the communication device to another cell than the serving cell. Such an immediate action may be taken according to various embodiments, as will now be described in further detail below. It is however to be understood that the described methods are to be used as a supplement to, rather than a replacement of, the existing HO procedure. A communication device should therefore still be able to handover to a cell with better radio conditions without the risk of a drop.

Methods according to three different embodiments will now be described below with reference to FIG. 6-8, respectively. The methods as described are to be executed in an apparatus which is typically forming part of a network node, but may alternatively be executed in another node as long as it is capable of exchanging necessary data between the mobile network and the respective communication device.

Figure 6:
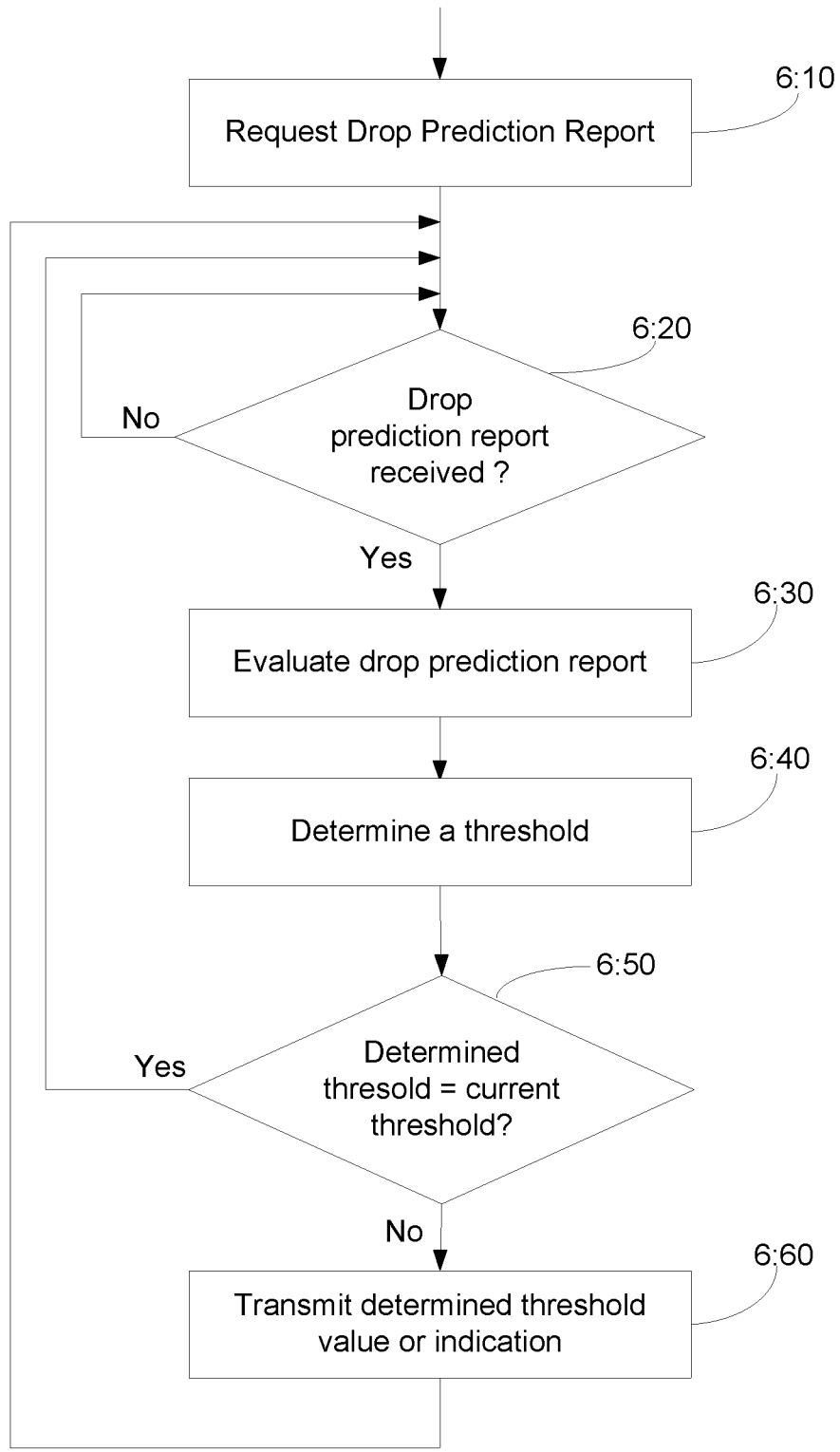
FIG. 6 is a flow chart illustrating a method for applying drop prediction in association with performing a HO decision, according to a first embodiment.

A method to be executed by, or for, a HO entity according to one embodiment is illustrated in FIG. 6, where in essence a HO entity which receives a requested drop prediction report will consider, based on the content of the received report, whether a threshold value presently applied by a communication device during a HO preparation procedure need to be amended and thus if such an updated threshold value need to be provided from the HO entity to the communication device. By applying the suggested method, the HO entity will be able to reconfigure the threshold value applied at the communication device after having considered the content of a drop prediction report provided from that communication device, i.e. a more dynamic threshold value will be applied by the communication device.

In a first step 6:10, a drop prediction report, is requested from a drop predictor by an apparatus comprising HO entity functionality as described above. Typically a request comprises one or more conditions for when a drop prediction report is to be provided to the apparatus. One such example may e.g. be that when drop prediction of the radio connection exceeds a predefined threshold, which may be referred to as a drop change threshold, a drop prediction report shall be generated and transmitted. In a next step 6:20, a reception of a requested drop prediction report from the communication device to which the request was sent is awaited, and the process will not continue until this occurs. One condition for receiving a drop prediction report may be the occurrence of a trigger event at the drop predictor, such as e.g. when the result of a drop prediction has changed from a no-drop to a predicted drop, in case the result of a report is provided as a binary measure, or when the result of a drop prediction has changed to such an extent that the change exceeds a certain threshold, herein referred to as a drop change threshold, in case the result of a report is provided as a drop probability. Alternatively drop prediction reports can be received on a periodic basis, i.e. every n seconds, or as a combination of the mentioned options. If a periodic basis is applied, such a periodicity may preferably be set e.g. to a value selected anywhere between 2-20 seconds, but also other settings may be applicable.

Once a drop prediction report has been received from the drop predictor, the process continues as indicated with the "Yes" branch of FIG. 6:20. In the latter case the received drop prediction report is evaluated as indicated with step 6:30, and a threshold value is determined by the HO device of the apparatus based on the content of the drop prediction report, as indicated with another step 6:40. The adaptable threshold value may be a HO hysteresis, a TTT, or any other type of threshold value which can be interpreted and processed by the user devices. It is also to be understood that, even though the describe process only refer to adaptation of one parameter, the process can be repeated for a plurality of parameters in case a plurality of adaptable parameters are desired.

Typically a threshold value is determined by calculating a threshold value, using the result from the drop prediction report as one input parameter. According to one embodiment, a mapping table is applied for the determination of the threshold value. The mapping table maps the drop prediction results in a form of drop probability to a list of threshold values. The mapping is performed, such that a certain range of the predicted drop probability has a corresponding threshold value. In the latter case, the applied granularity of the mapping table will determine the level of change that is applied. Typical values for the hysteresis may lay within the interval 0-15 dB, while the TTT may lay within the interval 0-6 s.

A non-limiting example of a typical mapping table, comprise both hysteresis and TTT is given in Table 1 below. It is however to be understood that a mapping table alternatively may comprise only one of the two parameters, while the other parameter may not be subject to adaptation according to the method described herein.

TABLE 1

| Drop prob. (%) | Hysteresis (dB) | TTT (sec.) |
|---|---|---|
| 0-0.19 | 10 | 5 |
| 0.20-0.49 | 6 | 3 |
| 0.50-0.69 | 3 | 2 |
| 0.70-0.89 | 2 | 1 |
| 0.90-1.00 | 0 | 0 |

According to another embodiment, the threshold value is instead adjusted by an increment or a decrement, depending on the drop prediction result. When the drop prediction result is in a form of drop probability and the threshold value is a HO hysteresis or TTT, the threshold value will be decreased by a decrement if the drop probability is above a certain probability threshold, while the threshold value will instead be increased by an increment if the drop probability is below a certain probability threshold. Also when applying the second embodiment, one or more of hysteresis and TT may be used as parameters, where the incremental and decremental steps may e.g. be 1 dB for the hysteresis and 0.5 sec. for the TTT. Typically maximum and minimum limits for the threshold value are applied to limit the range of the threshold value.

In a subsequent step 6:50 it is determined whether the determined threshold value is equal to the currently applied threshold value. In case it is determined that the two values are equal, no amendment of the threshold value is required, at least when considering the drop prediction report, and thus the process will return to step 6:20, wherein a new drop prediction report will be awaited before the process continues. If on the other hand there is a difference between the two values, the determined threshold value, or an indication thereof which can be interpreted by the communication device, is transmitted to the communication device, as indicated in step 6:60, after which the process continues by awaiting a new drop prediction report in step 6:20. Thereby, applied threshold values can be updated each time a new drop prediction report is provided to, and processed, or evaluated by the HO device. Consequently the described process will continue, such that in case drop prediction reports have been requested on a periodical basis, the process is repeated with the applied periodicity, while if one or more events are set to trigger a drop prediction report, the process will await the occurrence of such an event before repeating the process. However, in case new condition are required for when to receive a drop prediction report, the process will instead start with step 6:10, wherein the new conditions are provided to the communication device in a new request, and once the request has been received and processed by the communication device, the new condition or conditions will be applied.

While the method described above will affect the behavior of the communication device and the conditions it shall apply for providing a measurement report to the HO device, another alternative approach is presented below, with reference to FIG. 7, which more directly affects the HO execution, since requesting for a drop prediction report is always triggered by the actual reception of a measurement report from a communication device, and in case of a predicted drop, HO preparation and subsequent execution are initiated by the HO entity. Thereby a reception of a measurement report will always trigger the HO entity to request for and take a drop prediction result into consideration when determining whether or not to complete a HO.

More specifically, a reception of a measurement report is received from a communication device, as indicated in a first step 7:10. As indicated in another step 7:20, the reception of such a report triggers the HO entity to request for a drop prediction report. In a next step 7:30 it is determined if a drop prediction report has been received or, for some reason not received. In a typical scenario, any type of conventional timer functionality may be applied to allow for transmission time and processing time at the communication device, before determining that no report is to be received. The received report is then evaluated, as indicated with step 7:40, and based on the content of the received report, it is then determined whether a drop of the respective radio connection is predicted or not, as indicated in step 7:50. If no drop is predicted, the process is terminated and will be initiated again when a new measurement report is received. If a drop has instead been predicted, the applied HO procedure is continued by performing the HO preparation and execution steps, as indicated with another step 7:50. After completion of the HO, the process is terminated and reception of a new measurement report will trigger the process once again.

According to yet another embodiment a reception of a requested drop prediction report which results in a predicted drop will always trigger also a request for a measurement report, in case such a report is not already available to the HO entity, i.e. a predicted drop will always trigger a HO process rather than only a measurement report, such that, based on the received or available measurement report, the HO entity is then performing HO preparation and execution. Accordingly this embodiment will force a HO device to request a measurement report each time a drop is predicted instead of only when triggered by the conventional HO preparation steps.

More specifically, a drop prediction report is requested according to step 8:10, typically comprising conditions applicable for the communication device for when a report is to be provided. Such a report may be triggered as suggested above with reference to any of the other embodiments. In a next step 8:20, the process is continued once a report is received from the communication device, i.e. once relevant conditions have been fulfilled at the communication device. A received drop prediction report is evaluated, as indicated in step 8:30, and next it is determined, based on the content of the received drop prediction report, whether or not a drop is predicted for the radio connection set up between the communication device and the radio communication network, as indicated in step 8:40. If no drop is predicted according to the drop prediction report, the process is terminated and will start again when another drop prediction report is received and processed, wherein the process again will start from step 8:29 and 8:30. Upon having received a drop prediction report which is instead indicating a predicted drop, it is determined if a measurement report is available to the HO entity, as indicated with step 8:50. If a relevant measurement report is already available the process is continued by performing conventional HO preparation and execution phases based on the content of the measurement report, as indicated with step 8:80, while in case no such report is available, a measurement report is requested from the communication device, as indicated in step 8:60, and upon having received such a report from the communication device, as indicated in a subsequent step 8:70, HO preparation and execution can be performed according to step 8:80, also for this scenario. After the HO process has been executed, the process is terminated and may start again from step 8:10 once another request for a drop prediction report is triggered.

According to any of the embodiments mentioned above, the request for a drop prediction report may comprise conditions for a communication device on when to provide the requested drop prediction report. Such a condition may according to one embodiment comprise a predefined event, such as e.g. a change in the level of drop prediction of a respective radio connection, for a level exceeding a predefined drop threshold. Alternatively a certain periodicity may be applied. It is to be understood that although a request for a drop prediction report may comprise conditions for when to provide such a report, such conditions may alternatively already be available at the communication device, or provided to the communication device at another, earlier occasion. According to yet another embodiment, conditions may be provided in the request only when an update of already available conditions is required.

Figure 7:
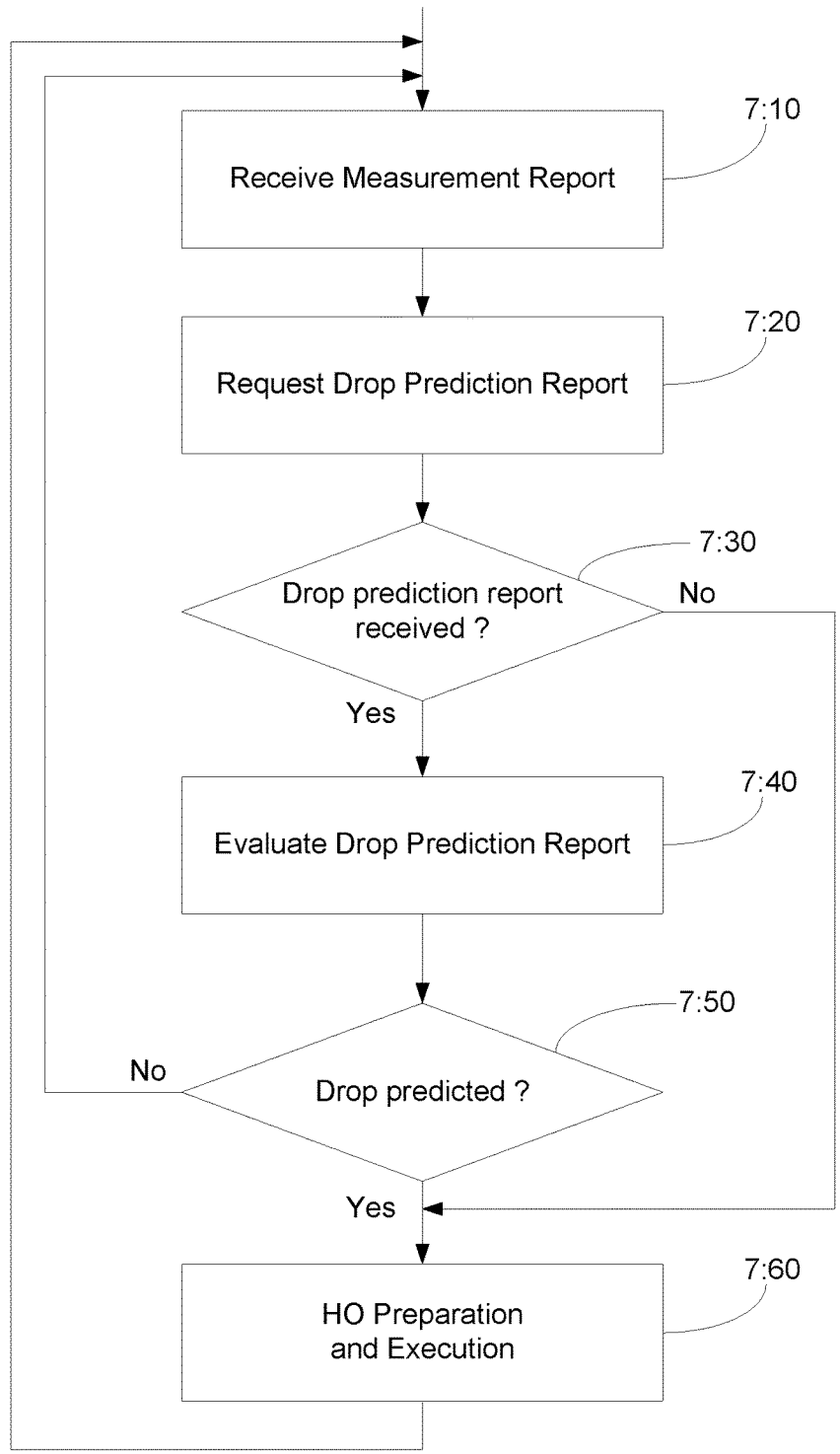
FIG. 7 is another flowchart illustrating a method for applying drop prediction in association with performing a HO decision, according to a second embodiment.
Figure 8:
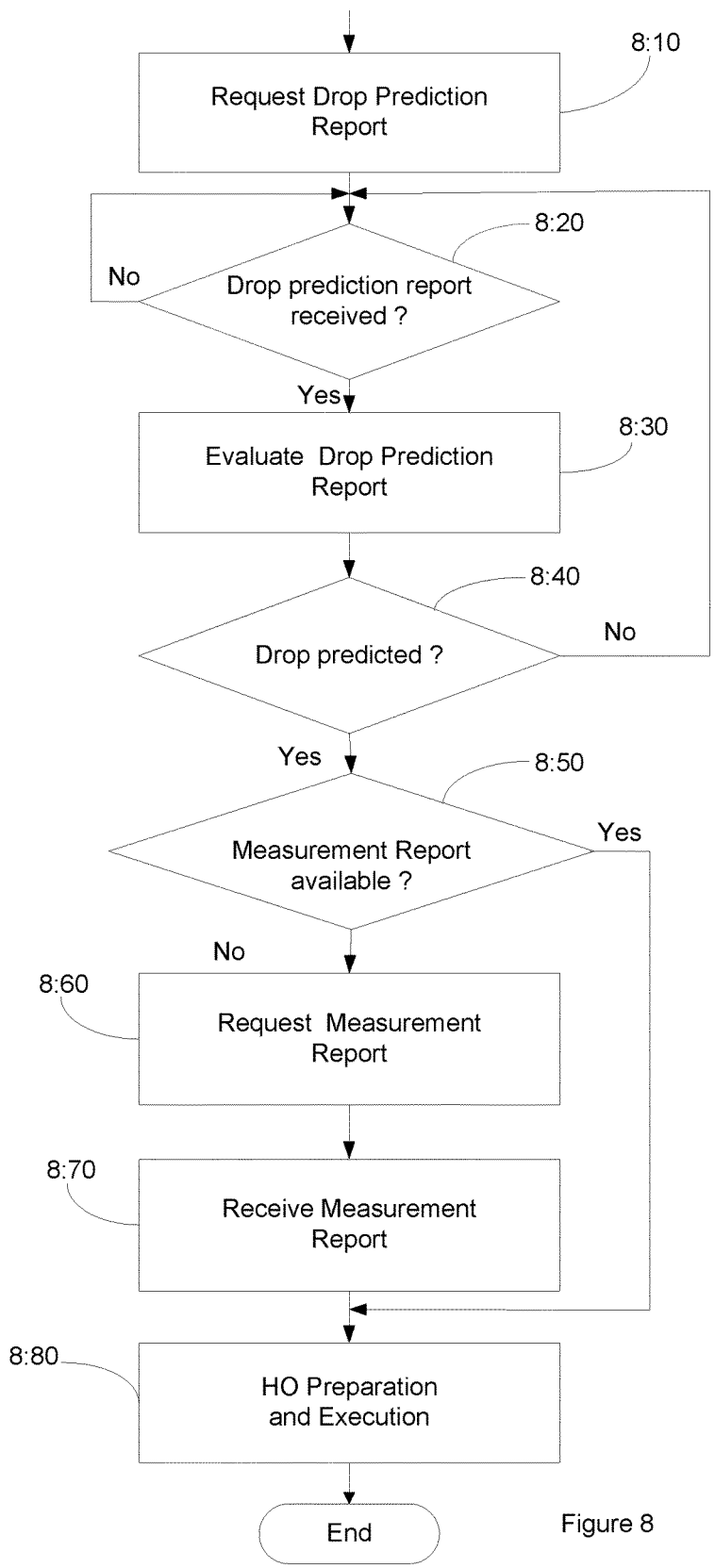
FIG. 8 is yet another flowchart illustrating a method for applying drop prediction in association with performing a HO decision, according to a third embodiment.

Although the flow charts of any of FIG. 6-8 are illustrating a respective process for obtaining a prediction valid for one specific radio connection, it is to be understood that a request can be sent also for a plurality of users and their associated radio connections, where each radio connection will give rise to a separate flow.

An apparatus comprising means which is configured to perform any of the methods as described above with reference to FIG. 6-8 according to one embodiment will now be described. As already indicated the apparatus disclose functionality which enables consideration of drop prediction reports, which typically will form part of a network node, such as e.g. an eNodeB, eNB, or any other type of access node.

The suggested apparatus 900 is adapted to request a drop prediction report from a communication device (not shown), indicating whether or not the radio connection is predicted to drop; receive a requested drop prediction report associated with the radio connection; determine, based on the content of the report, whether a first condition has been fulfilled; configure a first threshold value, specifying when a measurement report is to be provided from the communication device which is using the radio connection for which the drop prediction report has been received in case the first condition has been fulfilled and transmit the configured threshold value, or an indication of the configured threshold value, to the communication device.

The apparatus 900 may according to one embodiment comprise means configured to apply at least one condition which is specified as the occurrence of a predefined event, such as e.g. a predetermined change of the level of drop prediction of a radio connection.

The apparatus 900 may further comprise means configured to request for a drop prediction on a periodical bases, as suggested previously in this document, or triggered by one or more pre-determined events.

The apparatus 900 comprise means that is adapted to receive a drop prediction report comprising, either a numeric value, indicating that a drop is predicted or not predicted, a probability, or an indication of a probability which can be interpreted by the apparatus. In the latter case, the apparatus comprises means configured to interpret the indication of a drop prediction report as a binary indication, indicating a predicted drop or no predicted drop of a radio connection, or as a probability indication, indicating a probability of drop of the radio connection.

More specifically, the apparatus 900 described above may be adapted as illustrated in FIG. 9, comprising a plurality of interacting modules, where a requesting module 910, is adapted to request a drop prediction report from a communication device, indicating whether or not a certain radio connection is predicted to drop, corresponding to step 6:10 of FIG. 6. A receiving module 920 is adapted to receive a requested drop prediction report associated with the radio connection, corresponding to the "Yes" branch of step 6:20 and a evaluating module 930 is adapted to evaluate a drop prediction report, corresponding to step 6:30. The apparatus 900, also comprises a determining module 940 which is adapted to determine a threshold value, based on the drop prediction report, e.g. by calculating a threshold value based at least partly on the content of the drop prediction report, corresponding to step 6:40 and to determine whether the determined threshold value differs from or is equal to the presently applied threshold value, corresponding to step 6:50.

The apparatus also comprise a transmitting module 950 which is adapted to transmit the configured threshold value, or an indication of the configured threshold value, to the communication device, corresponding to step 6:60 of FIG. 6.

Alternatively, one or more modules suggested above may instead be arranged as hardware units, such as e.g. ASICS (Application Specific Integrated Circuit), such that the arrangement 900 instead comprises a plurality of interacting hardware units, or a combination of modules and hardware units.

An second apparatus 1000 according to a second embodiment, i.e. which is capable of performing the method as described above according to FIG. 7 is described below with reference to FIG. 10, where a receiving module 1020 is configured to receive a measurement report, according to step 7:10, and a requested drop prediction report, corresponding to the "Yes" branch of step 7:30. Alternatively, the apparatus 1000 can comprise two separate receiving modules, each dedicated for receiving one of the respective report types. A requesting module 1010 is configured to request a drop prediction report, corresponding to step 7:20. An evaluating module 1030 is configured to evaluate a drop prediction report, corresponding to steps 7:40 and 7:50. Furthermore, a HO module 1040 is configured to initiate required HO preparation and execution if required. The second apparatus 1000 may also comprise a timer module 1050, configured to provide timing functionality in association with step 7:30.

A third apparatus 1100 according to a third embodiment, i.e. which is capable of performing the method as described above according to FIG. 8 is described below with reference to FIG. 8, where a requesting module 1110 is configured to request a drop prediction report, corresponding to step 8:10 of FIG. 8, and a measurement report, corresponding to step 8:60. Alternatively, the third apparatus 1100 comprise two separate requesting modules, where each module is configured to request the respective report type. The third apparatus 1100 also comprises a receiving module 1120 which is configured to receive a measurement report, according to step 8:70, and a requested drop prediction report, corresponding to the "Yes" branch of step 8:20. Alternatively, the third apparatus 1100 comprise two separate receiving modules, each dedicated for receiving one of the respective report types. An evaluating module 1130 is configured to evaluate a received drop prediction report, corresponding to step 8:30 and 8:40, and to evaluate whether a measurement report is required, following the determination that a drop is predicted, corresponding to step 8:50. Alternatively, two separate evaluating modules may be configured to perform the different mentioned evaluations. Furthermore, a HO module 1140 is configured to perform HO preparation and execution, corresponding to step 8:80, when required.

Figure 9:
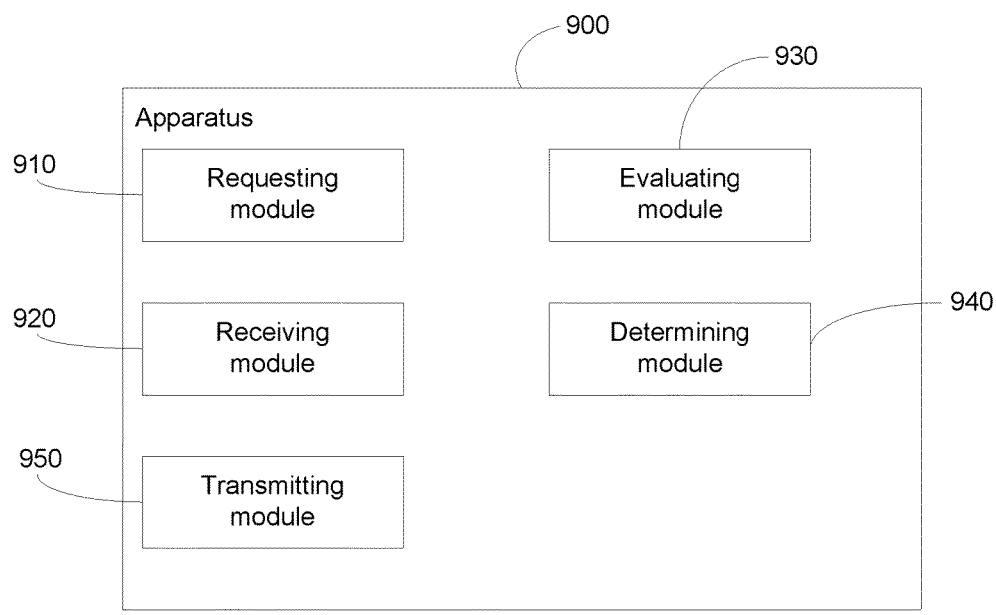
FIG. 9 is a block scheme illustrating an apparatus capable of applying drop prediction in association with performing or preparing for HO decision, according to a first embodiment.
Figure 10:
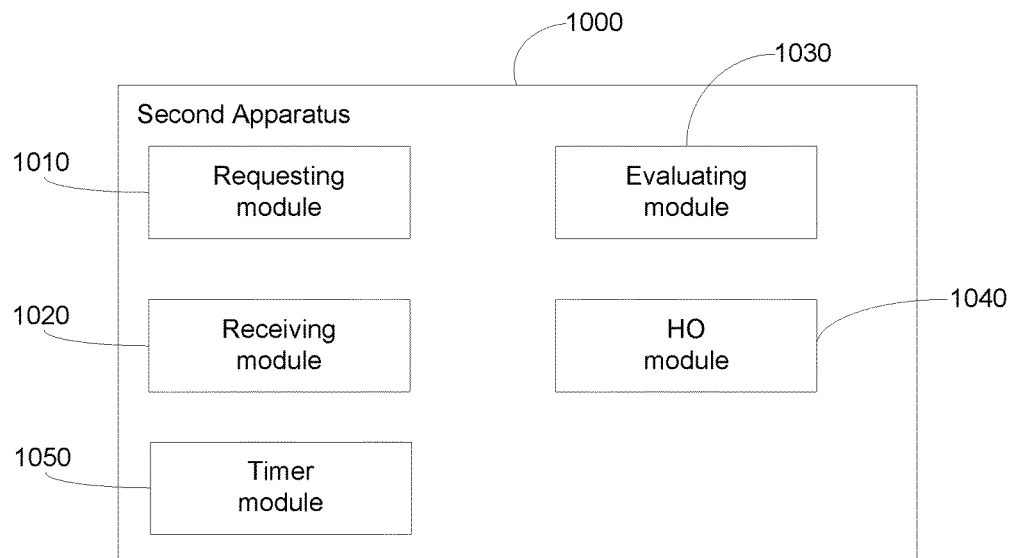
FIG. 10 is another block scheme illustrating a second apparatus capable of applying drop prediction in association with performing or preparing for HO decision, according to a second embodiment.
Figure 11:
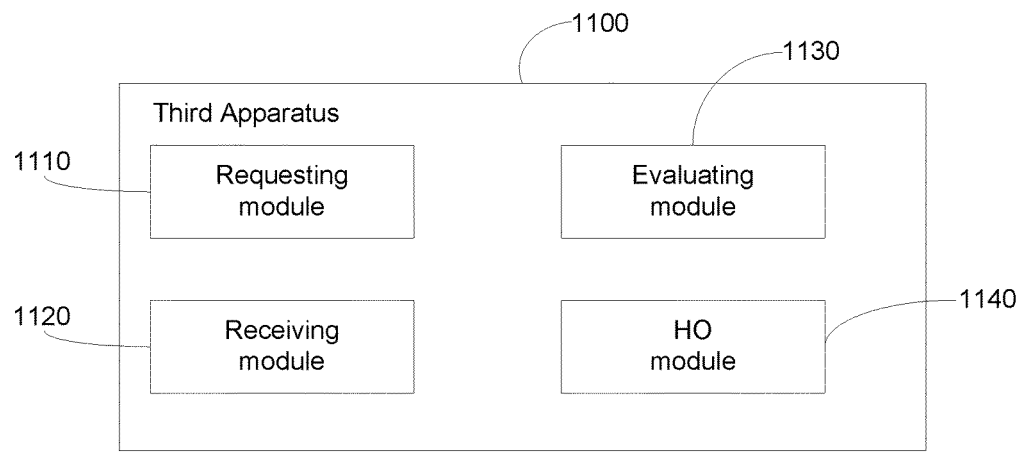
FIG. 11 is yet another block scheme illustrating a third apparatus capable of applying drop prediction in association with performing or preparing for HO decision, according to a third embodiment.
Figure 12:
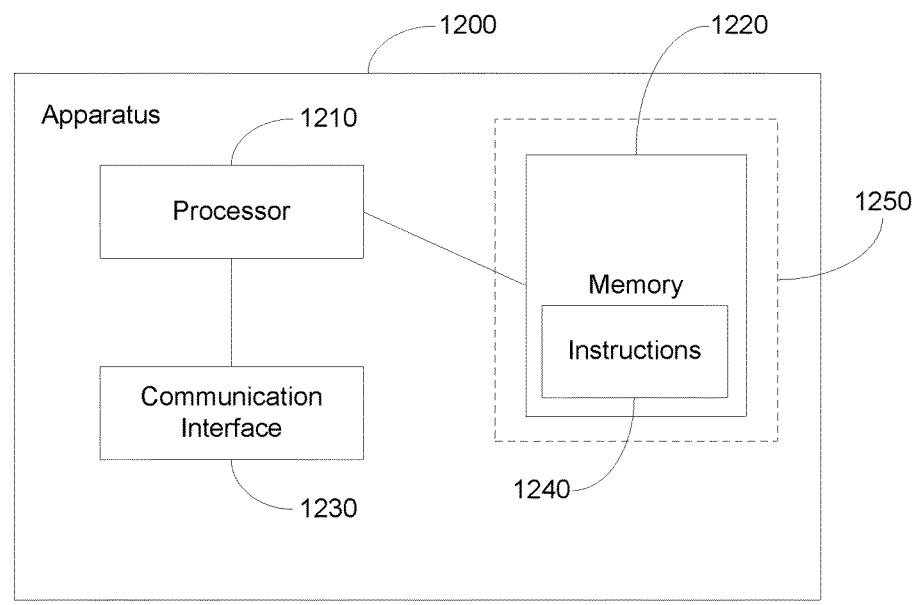
FIG. 12 is a block scheme illustrating an apparatus capable of applying drop prediction in association with performing or preparing for HO decision, according to another aspect.

It should be noted that FIG. 9-11 merely illustrates various functional modules or units in the apparatus in a logical sense and that the functions executable by these functional modules or units in practice may be implemented using any suitable software and hardware means/circuits. Thus, the embodiments are generally not limited to the shown structures of the apparatus and the functional modules or units. Hence, the previously described exemplary embodiments may be realised in many ways. For example, according to another aspect, the suggested functionality described according to any of the embodiments described above may be arranged as an apparatus 1200 comprising a processor 1210, such as e.g. a Central Processing Unit (CPU), and a memory 1220, where the memory 1220 comprise instructions executable by the processor 1210, whereby the apparatus is operative to execute the respective method, such that e.g. for the first embodiment according to FIG. 6, the apparatus request a drop prediction report from a communication device, indicating whether or not the radio connection is predicted to drop; receive a requested drop prediction report associated with the radio connection; determine, based on the content of the report, whether a first condition has been fulfilled; configure a first threshold value, specifying when a measurement report is to be provided from the communication device using the radio connection for which the drop prediction report has been received, in case the first condition has been fulfilled and transmit the configured threshold value or an indication of the configured threshold value to the communication device. The apparatus also comprises a communication interface 1030 via which the apparatus is capable of communicating with communication devices.

The processor may alternatively comprise two or more processing units. For example, the processor may include general purpose microprocessors; instruction set processors and/or related chips sets and/or special purpose microprocessors. The processor may also comprise board memory for caching purposes.

According to yet another aspect a computer program executable on an apparatus and capable of performing HO decisions as suggested above is provided. The computer program is provided in the form of a non-volatile memory, e.g. a flash memory, a disc drive, a RAM (Random-access memory) ROM (Read-Only Memory) or an EEPROM (Electrically Erasable Programmable Read-Only Memory), comprising instructions 1240 which, when run on the apparatus causes the apparatus to perform all the steps mentioned above. Accordingly, a computer program product 1250, comprising a computer program, such as the one suggested above, and a computer readable means on which the computer program is stored is also suggested.

A computer program and a computer program product adapted according to any of the embodiments suggested above are also provided.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

It should be noted that FIG. 9 merely illustrates various functional modules or units in the apparatus in a logical sense and that the functions executable by these functional modules or units in practice may be implemented using any suitable software and hardware means/circuits. Thus, the embodiments are generally not limited to the shown structures of the apparatus and the functional modules or units. Hence, the previously described exemplary embodiments may be realised in many ways.

The scope of the claims should not be limited by the preferred embodiments set forth in the given examples, but should be given the broadest interpretation consistent with the description as a whole.

The invention claimed is:

1. A method for preparing for handover decisions for established radio connections, the method comprising:
   requesting, from a communication device, a drop prediction report, indicating whether or not an established radio connection is predicted to drop;
   receiving, from the communication device, a requested drop prediction report associated with the radio connection;
   determining, based on the content of the report, a threshold value specifying when a measurement report is to be provided from the communication device using the radio connection for which the drop prediction report has been received;
   determining whether or not the determined threshold value is equal to a currently applied threshold value, and
   transmitting the determined threshold value, or an indication of the determined threshold value, to the communication device, in case the determined value is not equal to the currently applied threshold value.

2. The method of claim 1, wherein the request for a drop prediction report comprises at least one condition, indicating for the communication device when to provide the requested drop prediction report.

3. The method of claim 2, wherein the at least one condition is specified as the occurrence of a predefined event at the communication device.

4. The method of claim 3, wherein the condition is specified as in drop prediction of the radio connection exceeding a predefined drop change threshold.

5. The method of claim 2, wherein at least one condition is specified as a periodicity.

6. The method of claim 1, wherein the indication of a drop prediction report is any of a binary indication, indicating a predicted drop or no predicted drop of a radio connection, or a probability indication, indicating a probability of drop of the radio connection.

7. An apparatus capable of preparing for handover decisions for established radio connections, the apparatus being configured to:
   request a drop prediction report from a communication device, indicating whether or not an established radio connection is predicted to drop;
   determine, based on a requested drop prediction report associated with the radio connection and transmitted by the communication device, a threshold value specifying when a measurement report is to be provided from the communication device using the radio connection for which the drop prediction report has been received;
   determine whether or not the determined threshold value is equal to a currently applied threshold value; and
   transmit the determined threshold value, or an indication of the determined threshold value, to the communication device, in case the determined value is not equal to the currently applied threshold value.

8. The apparatus of claim 7, wherein the apparatus is configured to include into the request at least one condition indicating for the communication device when to provide the requested drop prediction report.

9. The apparatus of claim 8, wherein the apparatus is configured to specify the at least one condition as the occurrence of a predefined event.

10. The apparatus of claim 9, wherein the apparatus is configured to apply at least one condition which is specified as a change in drop prediction of the radio connection exceeding a predefined drop change threshold.

11. The apparatus of claim 8, wherein the apparatus is configured to request for a drop prediction report periodically.

12. The apparatus of claim 7, wherein the apparatus is configured to interpret the indication of a drop prediction report as any of a binary indication, indicating a predicted drop or no predicted drop of a radio connection, or a probability indication, indicating a probability of drop of the radio connection.

13. An apparatus capable of preparing for handover decisions for established radio connections, comprising: a processor and a memory storing instructions which when executed by the processor causes the apparatus to:
   request a drop prediction report from a communication device, indicating whether or not the established radio connection is predicted to drop;
   determine, based on a requested drop prediction report transmitted by the communication device and associated with the radio connection, a threshold value specifying when a measurement report is to be provided from the communication device using the radio connection for which the drop prediction report has been received;
   determine whether or not the determined threshold value is equal to a currently applied threshold value, and
   transmit the determined threshold value, or an indication of the determined threshold value, to the communication device, in case the determined value is not equal to the currently applied threshold value.

14. A computer program product comprising a non-transitory computer readable medium storing a computer program, executable on an apparatus, capable of preparing for handover decisions for established radio connections, the computer program comprising instructions which, when run on the apparatus causes the apparatus to:
   request a drop prediction report from a communication device, indicating whether or not the radio connection is predicted to drop;
   determine, based on the content of the report; a requested drop prediction report transmitted by the communication device and associated with the radio connection, a threshold value specifying when a measurement report is to be provided from the communication device using the radio connection for which the drop prediction report has been received;
   determine whether or not the determined threshold value is equal to a currently applied threshold value, and
   transmit the determined threshold value, or an indication of the determined threshold value, to the communication device, in case the determined value is not equal to the currently applied threshold value.

* * * * *